(12) United States Patent
Orion et al.

(10) Patent No.: US 11,099,850 B2
(45) Date of Patent: Aug. 24, 2021

(54) BRANCH PREDICTION CIRCUITRY COMPRISING A RETURN ADDRESS PREDICTION STRUCTURE AND A BRANCH TARGET BUFFER STRUCTURE

(71) Applicant: Arm Limited, Cambridge (GB)

(72) Inventors: Luc Orion, Mouans Sartoux (FR); Houdhaifa Bouzguarrou, Valbonne (FR); Guillaume Bolbenes, Antibes (FR); Eddy Lapeyre, Antibes (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/541,507

(22) Filed: Aug. 15, 2019

(65) Prior Publication Data

US 2020/0081717 A1    Mar. 12, 2020

(30) Foreign Application Priority Data

Sep. 11, 2018 (GB) .................... 1814730

(51) Int. Cl.
*G06F 9/38* (2018.01)
(52) U.S. Cl.
CPC .......... *G06F 9/3806* (2013.01); *G06F 9/3848* (2013.01)
(58) Field of Classification Search
CPC ............ G06F 9/3848; G06F 9/3806
See application file for complete search history.

(56) References Cited

U.S. PATENT DOCUMENTS

| | | | | |
|---|---|---|---|---|
| 5,454,087 A * | 9/1995 | Narita | ........ | G06F 9/3806 712/240 |
| 5,574,871 A * | 11/1996 | Hoyt | ........ | G06F 9/3806 712/200 |
| 5,604,877 A * | 2/1997 | Hoyt | ........ | G06F 9/3806 712/243 |
| 6,609,194 B1 * | 8/2003 | Henry | ........ | G06F 9/3806 712/238 |
| 2009/0217002 A1 | 8/2009 | Bonanno et al. | | |
| 2018/0060075 A1 * | 3/2018 | Chou | ........ | G06F 9/3806 |
| 2018/0121203 A1 | 5/2018 | Ishii et al. | | |
| 2019/0369999 A1 * | 12/2019 | Evers | ........ | G06F 9/30058 |
| 2020/0012497 A1 * | 1/2020 | Clouqueur | ........ | G06F 9/30058 |

OTHER PUBLICATIONS

Combined Search and Examination Report for GB1814730.6 dated Mar. 7, 2019, 5 pages.

* cited by examiner

*Primary Examiner* — William B Partridge
*Assistant Examiner* — Courtney P Carmichael-Moody
(74) *Attorney, Agent, or Firm* — Nixon & Vanderhye P.C.

(57) ABSTRACT

Branch prediction circuitry comprises: a return address prediction structure to store at least one predicted return address; and a branch target buffer (BTB) structure comprising entries each for specifying predicted branch information for a corresponding block of instructions. Within at least a subset of entries of the BTB structure, each entry specifies the predicted branch information with an encoding incapable of simultaneously indicating both: that the corresponding block of instructions is predicted to include a return branch instruction (for which the return address prediction structure is used to predict the target address); and the predicted target address for the return branch instruction. This can provide a more efficient BTB structure which requires less circuit area and power for a given level of branch prediction performance.

17 Claims, 8 Drawing Sheets

BRANCH PREDICTION CIRCUITRY COMPRISING A RETURN ADDRESS PREDICTION STRUCTURE AND A BRANCH TARGET BUFFER STRUCTURE

This application claims priority to GB Patent Application No. 1814730.6 filed Sep. 11, 2018, the entire contents of which are hereby incorporated by reference.

The present technique relates to the field of data processing. More particularly, it relates to branch prediction.

A data processing apparatus may have branch prediction circuitry for predicting outcomes of branch instructions before they are actually executed. By predicting branch outcomes before the branch instruction is actually executed, subsequent instructions following the branch can start to be fetched and speculatively executed before execution of the branch instruction is complete, so that if the prediction is correct then performance is saved because the subsequent instructions can be executed sooner than if they were only fetched once the outcome of the branch is actually known.

At least some examples provide branch prediction circuitry comprising: a return address prediction structure to store at least one predicted return address; a branch target buffer (BTB) structure comprising a plurality of entries for specifying predicted branch information for a corresponding block of instructions; and BTB lookup circuitry to look up whether the BTB structure comprises a corresponding entry for a given block of instructions, and when the BTB structure comprises the corresponding entry, to determine, based on the predicted branch information specified in the corresponding entry: a prediction of whether the given block of instructions includes a return branch instruction for which a predicted target address is to be predicted based on a predicted return address obtained from the return address prediction structure; a prediction of whether the given block of instructions includes at least one other type of branch instruction other than the return branch instruction; and when the given block of instructions is predicted to include the at least one other type of branch instruction, a predicted target address of the at least one other type of branch instruction; in which: within at least a subset of entries of the BTB structure, each entry specifies the predicted branch information with an encoding incapable of simultaneously indicating both: that the corresponding block of instructions is predicted to include the return branch instruction; and the predicted target address for the return branch instruction.

At least some examples provide a data processing apparatus comprising the branch prediction circuitry described above.

At least some examples provide branch prediction circuitry comprising: means for return address prediction, for storing at least one predicted return address; means for branch target storage, comprising a plurality of entries each for specifying predicted branch information for a corresponding block of instructions; and means for looking up whether the means for branch target storage comprises a corresponding entry for a given block of instructions, and when the means for branch target storage comprises the corresponding entry, for determining, based on the predicted branch information specified in the corresponding entry: a prediction of whether the given block of instructions includes a return branch instruction for which a predicted target address is to be predicted based on a predicted return address obtained from the means for return address prediction; a prediction of whether the given block of instructions includes at least one other type of branch instruction other than the return branch instruction; and when the given block of instructions is predicted to include the at least one other type of branch instruction, a predicted target address of the at least one other type of branch instruction; in which: within at least a subset of entries of the means for branch target storage, each entry specifies the predicted branch information with an encoding incapable of simultaneously indicating both: that the corresponding block of instructions is predicted to include the return branch instruction; and the predicted target address for the return branch instruction.

At least some examples provide a branch prediction method comprising: looking up whether a branch target buffer (BTB) structure, which comprises a plurality of entries each for specifying predicted branch information for a corresponding block of instructions, comprises a corresponding entry for a given block of instructions; and when the BTB structure comprises the corresponding entry, determining based on the predicted branch information specified in the corresponding entry: a prediction of whether the given block of instructions includes a return branch instruction for which a predicted target address is to be predicted based on a predicted return address obtained from a return address prediction structure; a prediction of whether the given block of instructions includes at least one other type of branch instruction other than the return branch instruction; and when the given block of instructions is predicted to include the at least one other type of branch instruction, a predicted target address of the at least one other type of branch instruction; in which: within at least a subset of entries of the BTB structure, each entry specifies the predicted branch information with an encoding incapable of simultaneously indicating both: that the corresponding block of instructions includes the return branch instruction; and the predicted target address for the return branch instruction.

Further aspects, features and advantages of the present technique will be apparent from the following description of examples, which is to be read in conjunction with the accompanying drawings; in which:

FIG. 1 schematically illustrates an example of a data processing apparatus having branch prediction circuitry;

FIG. 2 schematically illustrates an example of multiple branch instructions within the same fetch block of instructions, where a fetch block is a block of instructions for which branch information is looked up in a single lookup in a branch prediction structure;

Figure 1:
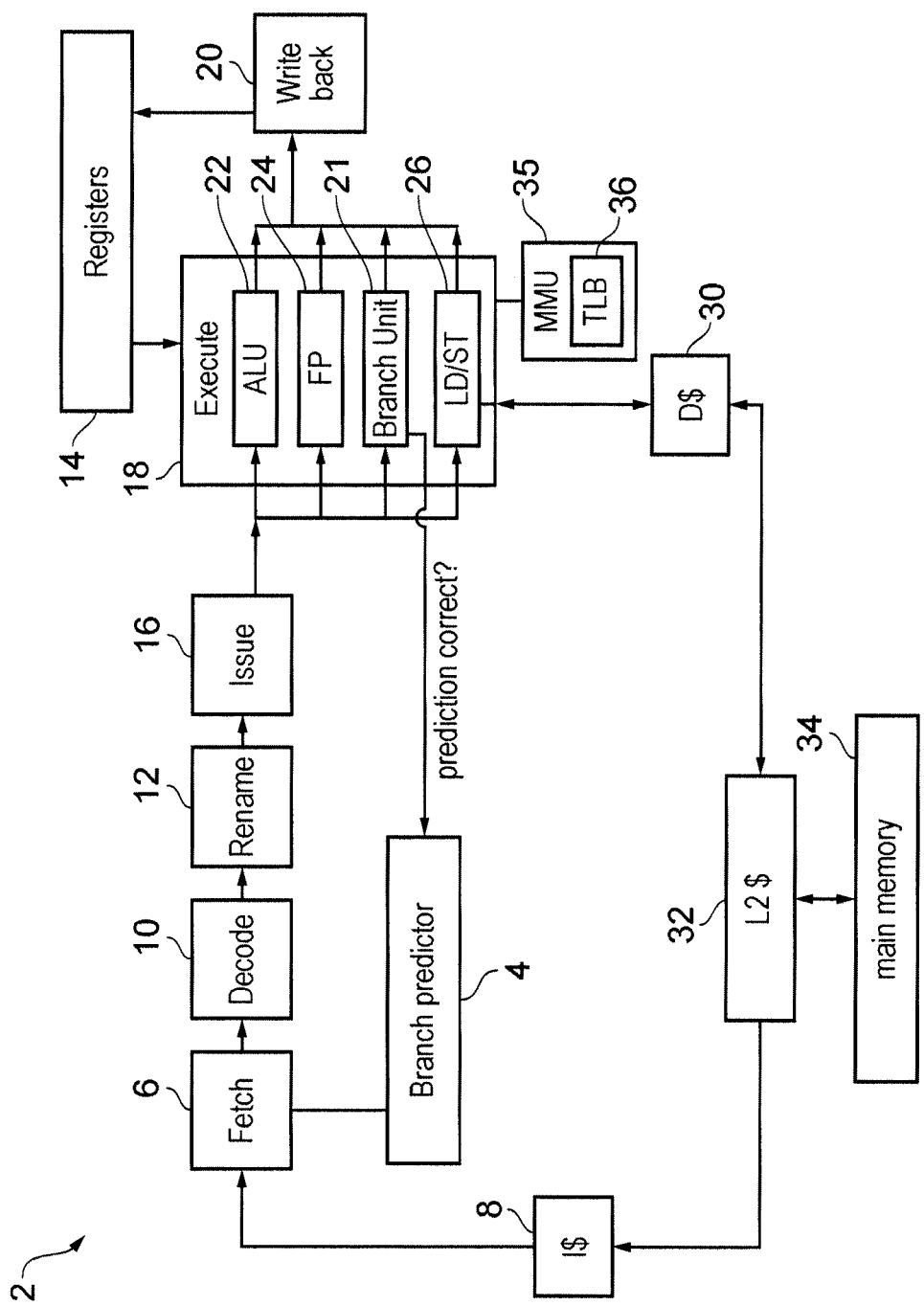

A branch predictor may have a branch target buffer (BTB) structure which has a number of entries, each for specifying predicted branch information for a corresponding block of instructions. For example, the predicted branch information may include a prediction of whether the block of instructions is predicted to include any branch instructions, and if so, the instruction offsets of those branches relative to the address identifying the block of instructions, and a predicted branch target address for any predicted branch locations. Also, other information such as branch type could be predicted by the BTB structure.

One type of branch instruction for which the BTB structure may indicate a prediction is a return branch instruction, which is used after processing of a function call or procedure call, to return program flow to the processing which was being performed before the function or procedure was called. In a typical BTB, the return branch may be represented in a given BTB entry in the same way as any other type of branch, including an indication of the predicted branch type and a predicted return address for the return instruction.

However, the inventors recognised that often the branch prediction circuitry may also include a return address prediction structure used for predicting return addresses of return branch instructions. A BTB may typically be designed to provide a single predicted target address for any given branch instruction, so may provide greater prediction accuracy for branch instructions where the target address is relatively stable. In contrast, for a return branch instruction, since the target address of the return branch may depend on the location in the code from which the corresponding function call or procedure call was made, the target address of a return branch may have much greater variation for a given return branch instruction at a given instruction address. Therefore, often a separate return address prediction structure may be used to predict the target address of a branch instruction predicted by the BTB structure as being a return branch instruction. The inventors recognised that this means that separately encoding in the BTB itself both a prediction that a given block of instructions is expected to include a return branch instruction and the predicted target address for the return branch instruction may waste storage resource. A separate indication of the predicted target address for the return branch instruction in the BTB structure may be redundant information, because when the branch is predicted to be a return branch instruction then the return address would be obtained from the return address prediction structure instead of from the BTB structure.

Hence, in the technique discussed below, for at least a subset of entries of the BTB structure, each entry may specify the predicted branch information with an encoding incapable of simultaneously indicating both (i) that the corresponding block of instructions is predicted to include the return branch instruction and (ii) the predicted target address for the return branch instruction. Hence, within that subset, either entries are able to predict the presence of return branch instructions, but do not specify a corresponding predicted target address, or the entries that can specify a predicted target address may not predict that the corresponding branch is a return branch instruction.

As the return branch's target address may require a relatively large number of bits of encoding space, compared to the indication of the prediction that the block of instructions includes the return branch, this approach can make the entries which predict the presence of a return branch instruction much more efficient in terms of circuit area and power. Also, this may be achieved without sacrificing performance since in the case when the return branch is predicted to be present then the target address is still obtained from the return address prediction structure instead of from the BTB. This approach can help to reduce the number of bits required per entry of the BTB to achieve a given amount of branch prediction performance. This can either enable the performance of the BTB to be enhanced with little additional area or power consumption, or enable the area/power cost of the BTB to be reduced while keeping almost the same performance. Either way, for a given level of performance the area and power cost may be reduced.

Hence, with the approach discussed above, when BTB lookup circuitry looks up the BTB structure to determine whether the BTB structure includes a corresponding entry for a given block of instructions, and there is a hit showing that the BTB structure does comprise the corresponding entry, then based on the predicted branch information specified in the corresponding entry, the BTB lookup circuitry may determine a prediction of whether the given block of instructions includes a return branch instruction and a prediction of whether the given block of instructions includes at least one other type of branch instruction other than the return branch instruction. In some embodiments, if there is a hit in an entry corresponding to a return branch instruction, then it may be implicit that there is no predicted branch instruction of another type, while in other embodiments the same entry may specify both return branches and other types of branch and so it may be possible for a simultaneous prediction of the presence of both the return branch and the branch of another type. When the given block of instructions is predicted to include at least one other type of branch instruction, then the corresponding entry may also provide a predicted target address of the at least one other type of branch instruction. However, when the corresponding entry is in the subset of entries having the more limited encoding discussed above, and specifies that there is a prediction that the given block of instructions is predicted to include the return branch of instruction, then no indication of a predicted target address may be provided by the BTB structure for the return branch instruction, and instead the predicted return address for the return branch instruction may be derived from the return address prediction structure.

The more limited encoding of the BTB entries (in which a given BTB entry cannot encode both the presence of a predicted return branch and that return branch's predicted target address) may be used for only a subset of entries of the BTB structure in some implementations. Hence in some examples there may be other entries which are capable of indicating both the presence of the return branch and the corresponding predicted target address of the return branch.

However, the area and power savings may be greatest if this more limited encoding is used for all entries of the BTB structure (i.e. all entries are either return branch supporting entries, or non-return branch supporting entries which are incapable of indicating a return branch presence prediction). Hence, in this case the "subset" of entries mentioned above may comprise all entries of the BTB structure, and there may be no entries which can indicate both the presence of the return branch and the return branch's target address. That is, in some implementations for every entry of the BTB structure, that entry may be incapable of simultaneously indicating both the predicted presence of the return branch instruction and that return branch instruction's target address.

The BTB structure may include at least one return-branch-supporting entry which specifies predicted branch information with an encoding capable of indicating that the corresponding block of instructions is predicted to include the return branch instruction. In some examples all BTB entries could be return-branch-supporting entries (these could be either entries which only support return branch predictions with no predictions for branches other than return branches, or entries which support both return branch predictions and non-return-branch predictions).

Alternatively in other implementations only a portion of the BTB structure could include return-branch-supporting entries which are capable of indicating a prediction that the corresponding block of instructions includes a return branch instruction.

In one example, for each return-branch-supporting entry, a field for specifying the predicted target address for the return branch instruction may be omitted from the predicted branch information specified in the return-branch-supporting entry. This can help to save area and power.

In addition to the prediction that the block of instructions is predicted to include the return branch instruction, the return-branch-supporting entry could also specify an offset value identifying an offset of an address of the instruction predicted to be the return branch instruction, relative to an address identifying the corresponding block of instructions. This can enable an instruction fetch unit to determine which earlier instructions still need to be fetched prior to the return branch in cases where the return branch is the first taken branch of the fetch block.

In some implementations, the return-branch-supporting entry may only indicate prediction information for return branch instructions, and may not indicate any predicted information for any other type of branch other than a return branch. In this case the at least one return-branch-supporting entry may be reserved for those blocks of instructions which are predicted not to include any other branch instructions prior to the return branch instruction. In this case, the return-branch-supporting entries may not have any field at all for specifying any target address, which can greatly help to reduce the area and power costs of the return-branch-supporting entries.

However, in other examples each return-branch-supporting entry could also specify information relating to at least one further branch instruction of at least one other type (other than the return branch instruction) that is within the same block of instructions as the return branch instruction. For each further branch instruction of the other type, the predicted branch information in the return-branch-supporting entry may still include a predicted target address for that further branch instruction. However, the field used to specify the predicted target address for that further branch instruction may not be used for indicating the target address predicted for the return branch instruction itself. Similarly, for each further branch instruction of the other type, the predicted branch information could include a predicted branch type, however this may be represented by an encoding which is incapable of identifying that the predicted branch type of the further branch instruction is a return branch instruction.

With this approach a single entry may encode both some predicted branch information for non-return branches and additionally encode a prediction of whether the corresponding block of instructions is expected to include a return branch instruction, without a corresponding indication of a predicted target address for the return branch instruction. This approach can be particularly useful because it has been observed that in many processing algorithms it is common for a block of instructions to include a conditional branch just before a return branch instruction, because some architectures may require that any return branch instruction is unconditional, and so if a conditional end of a function/procedure is required then this may be encoded using two separate branches in the program code, (first a conditional branch instruction evaluating the condition and then an unconditional return instruction).

Hence, with the approach where the return branch supporting entry includes both a prediction of the return branch and information relating to other branches, this means that for a given BTB entry encoding full predictions (including predicted target address) for a certain number N of non-return branch instructions, increased performance can be achieved without the addition of much additional hardware, by providing a further field encoding a prediction of whether a return branch instruction is predicted to be present in the same block, without needing to provide a further target address field for the return branch instruction prediction. Hence this can enhance the performance of the BTB with very little additional area or power consumption. In some examples, the further field encoding a prediction of the presence of the return branch instruction could be the offset field encoding the address offset for the return branch instruction.

Alternatively, as return branch instructions can be predicted relatively cheaply as the target address of the return branch does not need to be indicated, then if each entry (in addition to the return branch) specified predictions for a given number N of non-return branch instructions, then as it is no longer necessary to use one of those N branch fields to represent the return branch instruction itself, effectively each BTB may be able to provide predictions for a greater number of branches per block of instructions. As the branch prediction performance achieved per entry can therefore be improved, then in examples where the BTB is partitioned into return-branch supporting entries and non-return-branch supporting entries, another approach can be to reduce the total number of non-return-branch supporting entries of the BTB while maintaining an approximately similar level of performance, in order to save power and area and also enhance the timing of the design because the critical path length for looking up the BTB typically depends on the total number of entries. For example, if to provide a given level of performance, a BTB had 100 entries with each entry capable of indicating return branch presence predictions and also indicating the return branch's target address, with the approach discussed above this could be mapped to 70 non-return-branch-supporting entries which do not support return branch predictions at all, and 30 return-branch-supporting entries which are more area efficient because they do not need to indicate target address for the return branch. Hence, the area/power/timing budget required for a given level of performance can be improved.

There may be one embodiment where some dedicated entries are provided for encoding return branch instructions which do not have any indication of a target address of the branch (and also do not encode any information about return branches).

Also, there may be another embodiment where a BTB entry which encodes predictions for non-return branches is provided with additional fields to indicate a prediction of the presence of a return branch instruction and the offset address of the return branch. The number of additional bits needed may be limited by re-encoding the branch type for the non-return branches so as to exclude any need to encode the possibility of those non-return branches being a return branch instruction.

In some examples, in addition to the return-branch-supporting entries, there could also be at least one non-return-branch-supporting entry which specifies predicted branch information with an encoding incapable of indicating that the corresponding block of instructions is predicted to include the return branch instruction. Hence, for a given lookup if the corresponding entry is one of the non-return-branch-supporting entries then the BTB lookup circuitry may determine that the given block of instructions is not predicted to include the return branch instruction. For each branch instruction identified by a non-return branch supporting entry, the encoding of a predicted branch type may be incapable of identifying that the predicted branch type is the return branch instruction.

In some cases, the number of return-branch-supporting entries provided may be less than the number of non-return-branch-supporting entries. In other examples the number of return-branch-supporting entries could be greater than or equal to the number of non-return-branch-supporting entries. The number of each type of entry may be determined for a particular architecture based on the relative frequency of return and non-return branches expected in the code to be executed.

In some examples, the BTB lookup circuitry may exclusively reserve the at least one return-branch-supporting-entry for storing predicted branch information for blocks of instructions that include a branch instruction predicted to be a return-branch instruction. This helps to maintain prediction accuracy by conserving those entries which support the prediction of a return-branch instruction for those blocks of instructions that can actually use that prediction. Hence, in an example where a return-branch-supporting entry can also specify predictions for further branches of a type other than the return-branch instruction, such entries may not be used for blocks of instructions which only contain non-return-branch instructions. This can reduce the number of return-branch-supporting entries needed to support a given level of performance.

The return address prediction structure may comprise a last-in first-out (LIFO) data structure. For example, the return address prediction structure may comprise a call-return stack. The BTB lookup circuitry may push a return address onto the LIFO data structure in response to a determination that the corresponding entry of the BTB structure provides a prediction that the given block of instructions comprises a procedure call instruction when there is no earlier branch instruction predicted taken in the given block of instructions being looked up in the BTB. The procedure call instruction could call either a procedure or a function (a function is a specific form of procedure where a return data value generated by the function is passed back to the code which called the function). On the other hand, when the given block of instructions is predicted based on one of the return-branch-supporting entries to include a return branch instruction, then the address at the top of the LIFO data structure may be popped from the data structure and the popped address may be used as the predicted target address of the return branch instruction.

A selector may be provided to select, based on a number of different branch prediction structures (including the return branch prediction structure and the BTB structure), a next instruction fetch block address identifying a next block of instructions to be fetched. When the BTB structure provides a prediction that the given block of instructions includes the return branch instruction, and no earlier branch instruction of the given block of instructions is predicted taken (for example the taken prediction may be generated by a separate branch direction predictor) then the selector may select the return branch address provided by the return branch prediction structure as a predicted target address for the return branch instruction in preference to a predicted target address provided by at least one other prediction structure of the branch prediction circuitry.

FIG. 1 schematically illustrates an example of a data processing apparatus 2 having a processing pipeline comprising a number of pipeline stages. The pipeline includes a branch predictor 4 for predicting outcomes of branch instructions. A fetch stage 6 generates a series of fetch addresses based on the predictions made by the branch predictor 4. The fetch stage 6 fetches the instructions identified by the fetch addresses from an instruction cache 8. A decode stage 10 decodes the fetched instructions to generate control information for controlling the subsequent stages of the pipeline. Optionally, a rename stage 12 may be provided to perform register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction. In an in-order pipeline however, the rename stage may not be provided.

An issue stage 16 queues instructions awaiting execution until the required operands for processing those instructions are available in the registers 14. An execute stage 18 executes the instructions to carry out corresponding processing operations. A writeback stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement (e.g. the level two cache 32 may not be shared, but instead separate L2 instruction and data caches could be provided). Access to memory may be controlled using a memory management unit (MMU) 35 for controlling address translation and/or memory protection. The load/store unit 26 may use a translation lookaside buffer (TLB) 36 of the MMU 35 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

Figure 2:
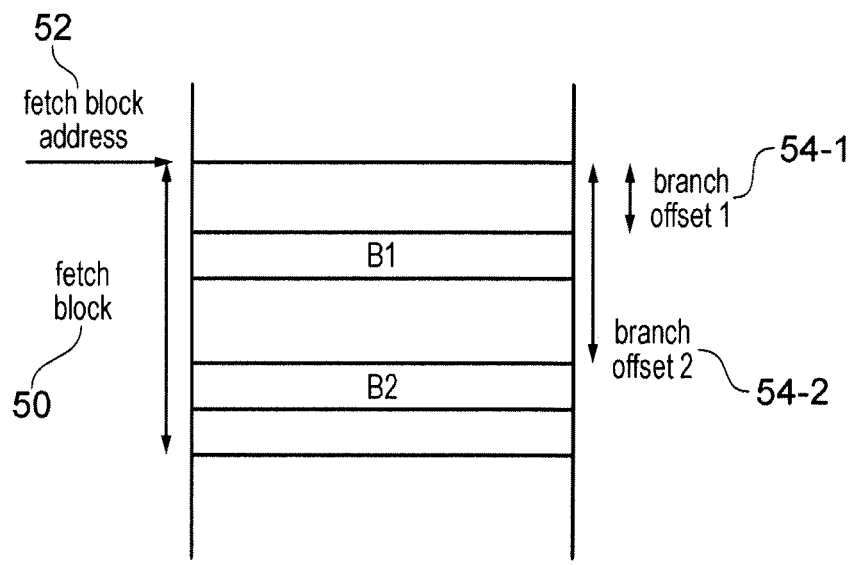
Figure 3:
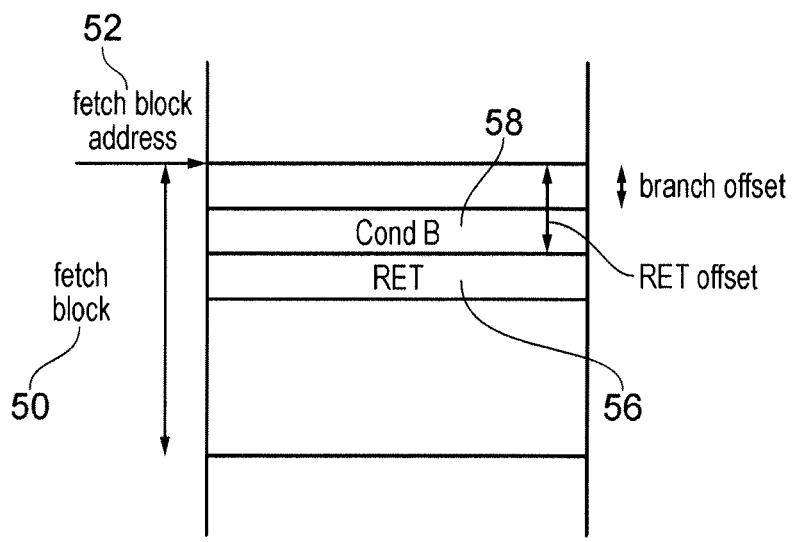
FIG. 3 shows an example where the fetch block includes a conditional branch instruction and a return branch instruction.

As shown in FIGS. 2 and 3, the branch predictor 4 may use a block-based lookup method to perform branch prediction for a block of program instructions to be fetched. While in alternative implementations it may be possible for the branch predictor to provide individual branch prediction entries for each instruction and separately look up each instruction in a storage structure storing the predictions, this may involve a large number of lookups to the storage structure which can consume a lot of power and be slow in terms of performance. By performing branch prediction lookups in units of blocks of instructions, this enables the branch predictor to traverse the code faster than the decoder and execution units, which can help with enabling the branch predictor to "look ahead" of the point of execution reached by the execution units so that the required instructions can be fetched earlier. In practice, it is relatively unlikely that a block of instructions of a given size (e.g. 8 or 16 instructions) will have more than a certain number of branches and so it is possible to provide branch state storage entries which represent predictions for a block of instructions as a whole, and may provide predictions as to whether there are any branches in that block of instructions, and if so, the locations of the branches within the block. For example, as shown in FIG. 2, within a given block 50 of instructions identified by a fetch block address 52 (which indicates the instruction address of the first instruction in the fetch block 50), there may only be two branch instructions B1, B2 and the branch predictor 4 may provide a prediction of the branch offsets 54-1, 54-2 representing the offset of the instruction addresses of branches B1, B2 relative to the fetch block address 52. For area and timing reasons, the number of branches that may be predicted in a fetch block may be lower than the number of instructions in the fetch block, e.g. a fetch block may comprise 8 instructions but the branch prediction can store and predict up to 4 branches within the fetch block.

The branch predictor 4 may also provide a prediction of the particular type of branch instruction that may be encountered within a given fetch block, such as whether the branch is a conditional branch for which a taken or not-taken prediction is required to be made by a branch direction predictor, whether the branch is a function/procedure calling branch instruction for which a return address may need to be saved, or a return branch instruction for returning to earlier processing after the processing of a function/procedure call.

In some architectures, all return branch instructions may be unconditional instructions. Hence, as shown in FIG. 3 it may be relatively common for a return branch instruction 56 to be preceded by a conditional branch instruction 58 evaluating whether some test condition is satisfied, which conditionally branches to a certain branch target address depending on the outcome of the test condition. Hence, if the conditional branch 58 is taken then processing does not continue to the return branch 56, but if the conditional branch 58 is not taken then the return branch 56 is executed. As discussed below, this property that a return branch 56 may relatively often follow an earlier conditional branch within the same fetch block 50 can be exploited to provide a more efficient encoding of BTB entries.

Figure 4:
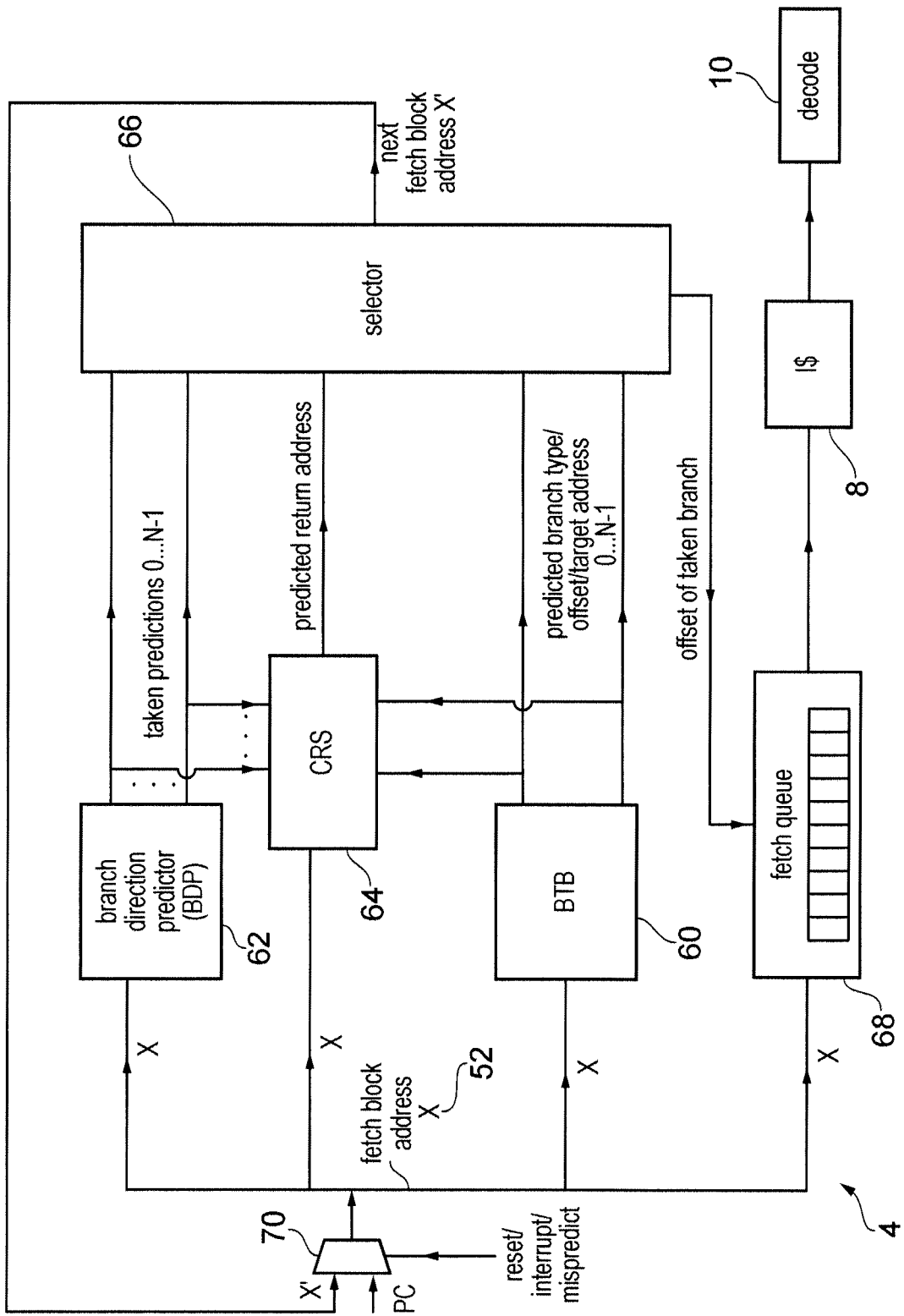
FIG. 4 shows an example of components of the branch predictor including a branch direction predictor, branch target buffer and a call-return stack.

FIG. 4 shows an example of components of the branch predictor 4, including a branch target buffer (BTB) 60, a branch direction predictor (BDP) 62 and a call-return stack (CRS) 64. In each cycle of branch prediction, the fetch block address X (52) representing the address of the next instruction to be fetched by the fetch stage 6 is input to the BTB 60, BDP 62 and CRS 64. The BTB 60 and BDP 62 both include a storage structure for storing various branch prediction state entries. In the case of the BDP 62, the branch prediction state entries provide a prediction of whether (if there is any conditional branch instruction within the block of instructions represented by the fetch block address X), those instructions should be taken or not taken. The BDP 62 can be implemented according to any known type of branch predictor, such as TAGE, perceptron, gskew, etc. (this list is not exhaustive).

The BTB 60 includes a number of entries which provide predictions of one or more of: whether there are any branches expected to be included in the block of instructions identified by the fetch block address X, the offsets of those branches relative to the fetch block address X, the types of the predicted branches, and for at least some branch types, a predicted target address for the branch. Here, the target address refers to the address to which program flow is to be directed if the branch is taken.

Hence, for branches other than return branch instructions, the BTB 60 may provide a prediction of the branch type, offset and target address of the predicted branches, and if any of the branches are conditional branches, then the BDP 62 provides predictions of whether those branches are taken or not taken. Based on the predictions provided by the BTB 60 and the BDP 62, a selector 66 selects which program instruction address is to be used as the next fetch block address X' in the next branch prediction cycle. Also, based on the offsets of any taken branches, the selector 66 determines how many instructions of the current fetch block identified by fetch block address X will need to be fetched, and provides a signal to a fetch queue 68 which queues addresses of instructions to be fetched by the fetch stage 6, to ensure that all instructions up to the first taken branch within the current fetch block will be fetched by the fetch stage 6. The fetch queue 68 is used to control fetching instructions from the instruction cache 8 by the fetch stage 6. The fetched instructions are decoded by the decode stage 10.

For example, if a given BTB entry specifies non-return branches in offsets 2, 3, and 7 and a return branch in offset 5, and the BDP 62 specifies a prediction of not-taken for offsets 2 and 3, taken for offset 7 (with the return branch being either unconditionally taken or predicted taken if the architecture supports conditional return branches), then the first taken branch would be the return branch at offset 5, and so the offset selected by the selector 66 would be the offset 5. The instruction addresses allocated to the fetch queue would correspond to instructions at offsets 0-5 from the fetch block address X. In contrast, if the non-return branch at offset 2 had been predicted taken by the BDP 62, then the fetched instructions would comprise the instructions at offsets 0-2 from the fetch block address X, as instructions beyond the first taken branch in the block would not be fetched.

The next fetch block address X' selected by selector 66 is provided to an address selector 70 which selects which address is used as the fetch block address X in the next branch prediction cycle. For most cycles, the next fetch block address X' from one branch prediction cycle is used as the fetch block address X for the following cycle. However, if there is a system reset, interrupt or branch misprediction, then the program counter may be set to a new value (e.g. a reset value, interrupt handler address or misprediction address), and the new program counter value may be supplied as the fetch block address X for the first branch prediction cycle after processing restarted following the reset, interrupt or misprediction.

The call-return stack 64 is provided to improve prediction accuracy when function or procedure calls and returns are made within the code being executed. A procedure or function call refers to the calling of a certain sequence of instructions from a particular location within the program code being executed, where it is intended that once the function or procedure has finished, then processing returns to the instruction after the calling instruction which called the function or procedure. The same function or procedure may be called from a number of different locations in the code, and so often the target address of return branch instructions may differ depending on the location from which the function or procedure was called. This can make it difficult to predict the target address of the return branch instruction using the BTB 60, which is why a dedicated return branch address prediction structure may be provided in the form of a call-return stack 64. In the examples below, the term "procedure" is used for conciseness, but is intended to encompass either a procedure or a function.

Figure 5:
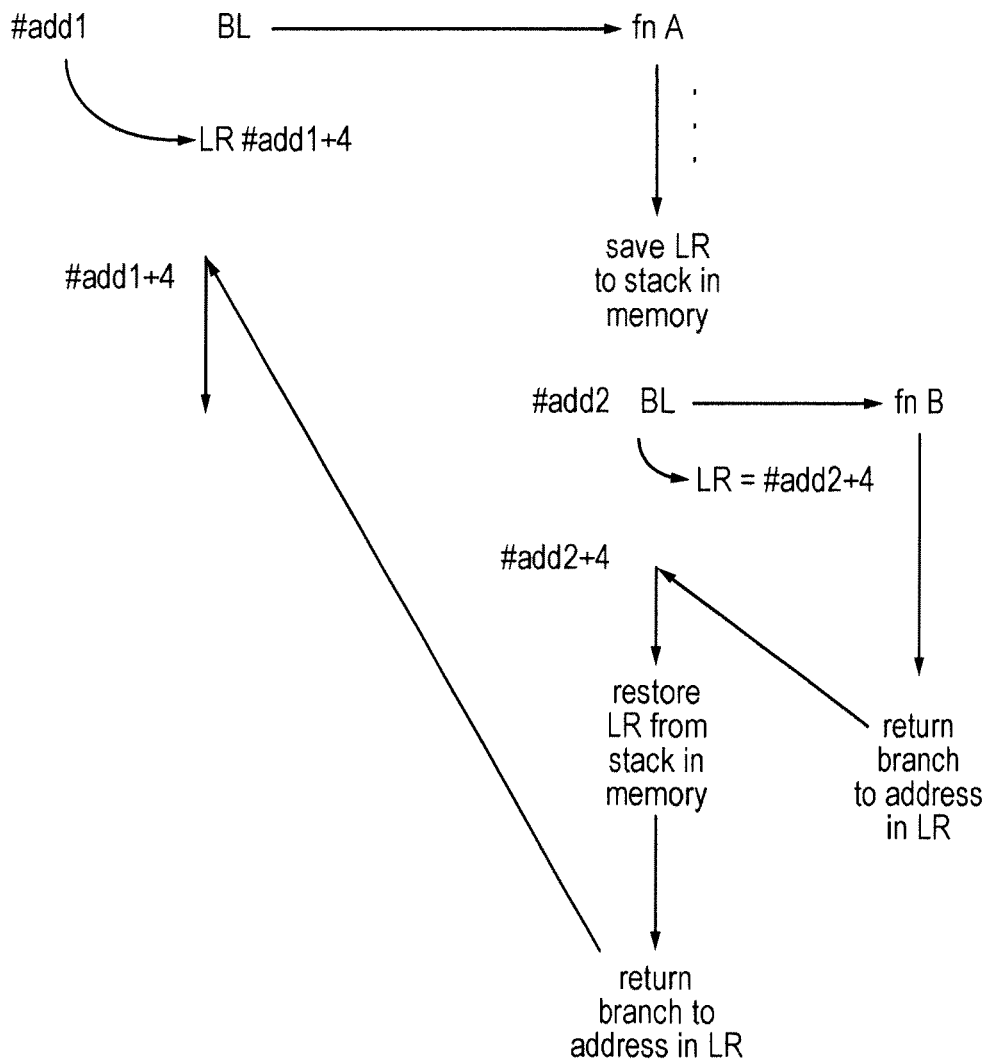
FIG. 5 shows an example of nested procedure calls.

FIG. 5 shows an example of a nested set of procedure calls. A branch with link (BL) instruction at an address # add1 calls a certain procedure (fn A). In response to the BL instruction at address # add1 the pipeline stores the return address of function A to the link register within the register file 14. The return address is the address of the next sequential instruction after the BL instruction, e.g. address # add1+4. In response to the BL instruction the program flow branches to the address of an instruction at the start of the code corresponding to fn A, and then execution continues sequentially within that function. Within fn A, a further procedure (fn B) is called by a BL instruction at address # add2. As the BL instruction would overwrite the previous contents of the link register (LR), the value in the link register which provides the return address for fn A is saved to a stack data structure within the memory system 30, 32, 34 before executing the second BL instruction at address # add2. Note that this stack in the memory system is not the same as the call return stack 64, but is a stack data structure allocated by software in memory. Hence, in response to the second BL instruction at address # add2, the return address of fn B (# add2+4) is saved to the link register and then program flow branches to the program code corresponding to fn B. Once the fn B completes, a return branch is executed which triggers the branch unit 21 to read the return address previously saved to the link register and cause program flow to branch to the instruction at the return address # add2+4. The remaining part of the code in fn A then restores the previous contents of the link register (i.e. return address # add1+4) from the stack in memory to the link register in the register file 14 and then flow continues within fn A until a second return branch is reached which then triggers the branch back to the instruction at address # add1+4.

Figure 6:
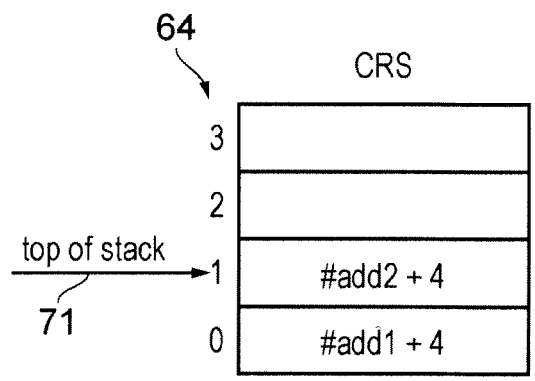
FIG. 6 shows an example of tracking return addresses of procedure calls on a call-return stack.

FIG. 6 shows an example of the call return stack 64 updated with the addresses of the respective function calls. FIG. 6 shows the state of the call return stack 64 at the point when the processing is within fn B in the example of FIG. 5. The call return stack (CRS) may be a last in first out (LIFO) structure, which can be maintained as a circular buffer for example with a pointer 71 indicating the entry corresponding to the top of the stack. The top of the stack is the most recently allocated entry on the stack (and also the entry which will be popped from the stack the next time a return branch is encountered by the fetch stage 6). The branch predictor 4 uses the call return stack to predict the return address of a return instruction earlier than the timing when the return address actually becomes known when the branch is executed by the branch unit 21 later in the pipeline.

Hence, when the BTB 60 is looked up for the fetch block address 52 and provides a prediction that the corresponding block of instructions is predicted to include a procedure calling branch instruction (e.g. the BL instruction shown in FIG. 5) then the address of the instruction following the procedure calling branch instruction is pushed onto the call-return stack as a return address to be used for predicting the target address of a later return instruction.

On the other hand, when the BTB 60 provides a prediction that the current fetch block is predicted to include a return branch instruction and there are no earlier predicted taken branches in the same block, then the return address at the top of the stack 51 is popped from the CRS 64 and this return address is then used as the predicted target address for the return branch instruction. Hence, the selector 66 always predicts the return address popped from the CRS 64 in preference to any alternative target address available from the BTB 60, in cases where the first taken branch is predicted to be a return branch instruction.

Figure 7:
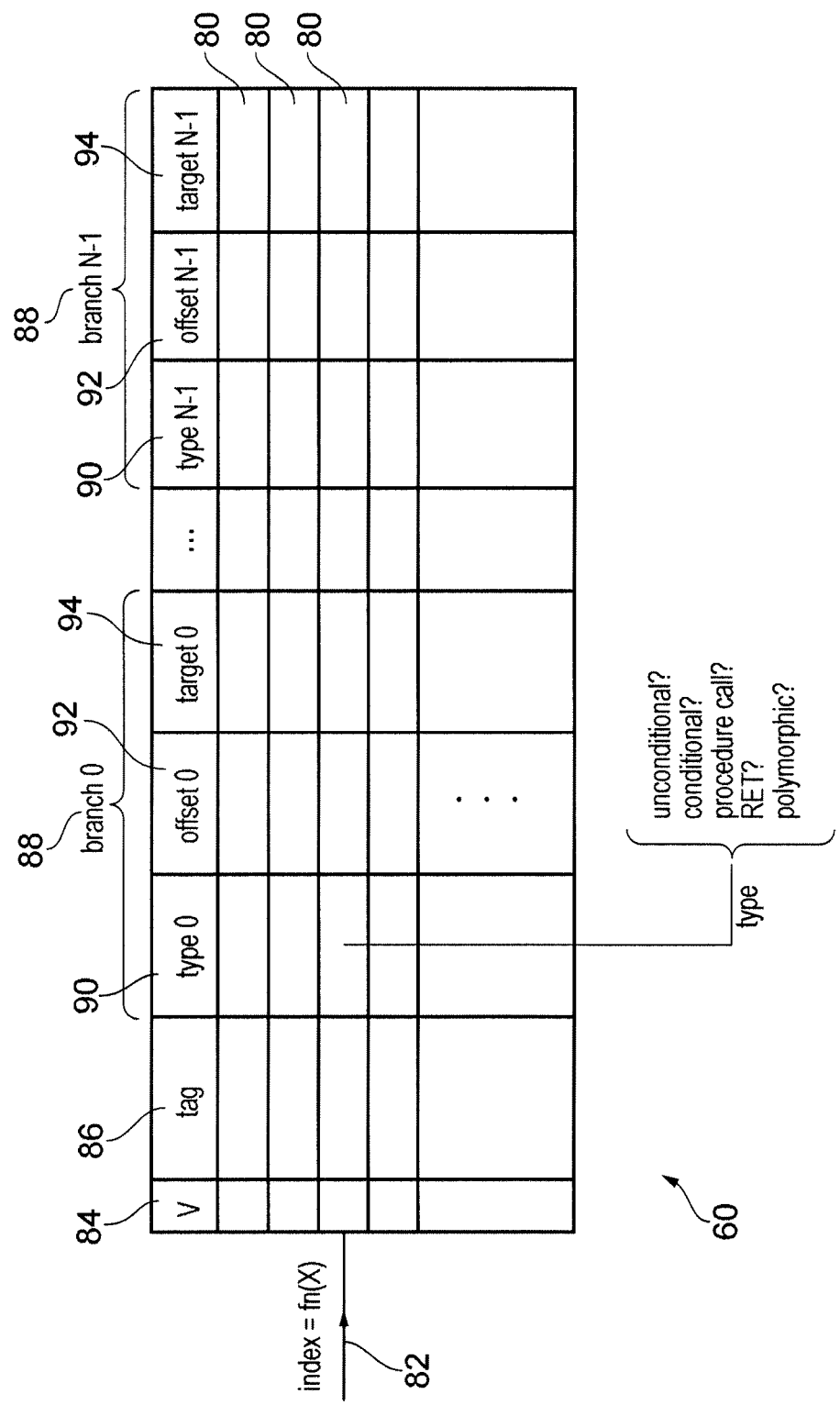
FIG. 7 shows a comparative example of branch target buffer entries in which each entry has an encoding capable of simultaneously indicating both that the corresponding block of instructions includes a return branch instruction and the predicted target address for the return branch instruction.

FIG. 7 shows, for comparison, a typical way of representing branch prediction state information in the BTB 60. The BTB 60 may include a number of entries 80 in a storage structure, which may be implemented similar to a cache. Although not shown in FIG. 7, in some cases the cache may be implemented as a set-associative cache organised in ways (way 0, way 1, etc.). In general, the storage structure of the BTB 60 is indexed by an index value 82 which is determined as a function of the fetch block address X. Each entry 80 of the BTB may include for example a valid field 84 which specifies whether the entry contains a valid prediction entry, and a tag field 86 for storing part of the address of the corresponding block of instructions. The tag 86 can be compared with part of the fetch block address X on looking up the BTB to determine whether there is a hit. The entry 80 may then also include prediction information for a certain number N of branch instructions. For each branch instruction, the BTB entry 80 includes a set of fields 88. Each set of branch information fields 88 includes a type field 90 providing a prediction of the type of branch, an offset field 92 providing a prediction of the offset of the instruction address of the branch instruction relative to the fetch block address, and a target address field 94 providing a prediction of the target address of the corresponding branch.

It will be appreciated that FIG. 7 does not illustrate all of the information that could be recorded for each branch. For example the branch information 88 could also include an indication of a confidence level in the corresponding prediction, and could also include a branch presence indicator which indicates whether that branch is expected to be present at all, or alternatively the presence or absence of branches could be recorded as part of the type field 90. The type field may specify one of a number of branch types, including unconditional branches whose taken or not taken outcome does not depend on a condition evaluated based on results of earlier instructions, a conditional branch for which the taken or not taken outcome depends on a condition which depends on architectural state resulting from earlier instructions, a procedure calling branch or return branch as discussed above, or other types of branches such as polymorphic branches which may provide different target addresses on different instances of executing the same branch, for which a separate dedicated polymorphic branch prediction structure could be provided for example. It will be appreciated that this is not an exhaustive list of branch types.

Note that within the BTB entry, it is not necessary to arrange the prediction information for the different branches in the same search block according to the order of their offsets 92. For example, if N=4 and so the entry can specify information for up to 4 different branches, and the corresponding fetch block includes two branches B1 and B2 as in the example of FIG. 2, the information for branches B1 and B2 could be allocated to any of the positions 0 to N-1 shown in FIG. 7, e.g. B1 could be in position 0 but B2 in position N-1, or B1 in position 2 and B2 in position 0. It is not necessary that the allocations to the N sets of branch fields 88 are done in the order 0 to N-1, or that the selection of the set of branch fields 88 is in order of the branch offsets within the fetch block.

In the approach shown in FIG. 7, each of the branches 88 represented in a given BTB entry 80 has the branch type field 90 which supports indicating the branch as a return branch instruction (RET). In addition, each of the branch fields 88 also enable prediction of a target address 94 for the corresponding branch. Hence, this encoding is capable of defining both that the block of instructions is predicted to include a return branch instruction and capable of indicating the predicted target address for the return branch.

Figure 8:
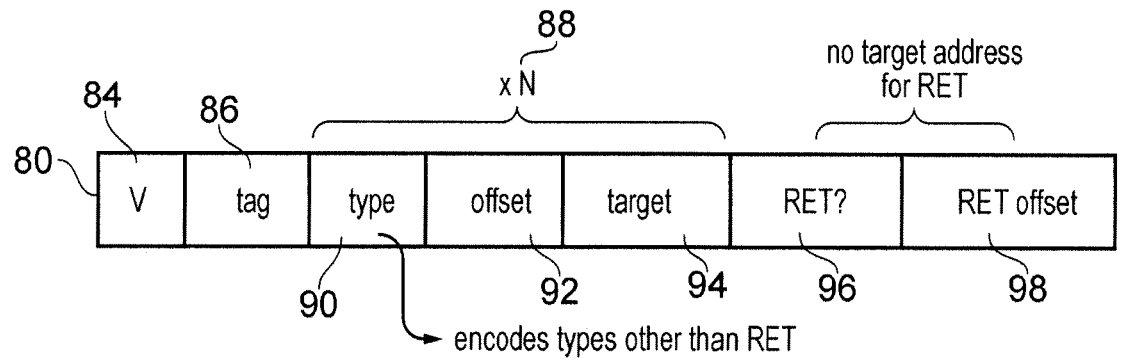
FIG. 8 shows a first embodiment in which the branch target address field is omitted for the return branch instruction so that the branch target buffer entry is incapable of simultaneously indicating both the presence of a return branch instruction and the predicted target address for the return branch instruction.
Figure 9:
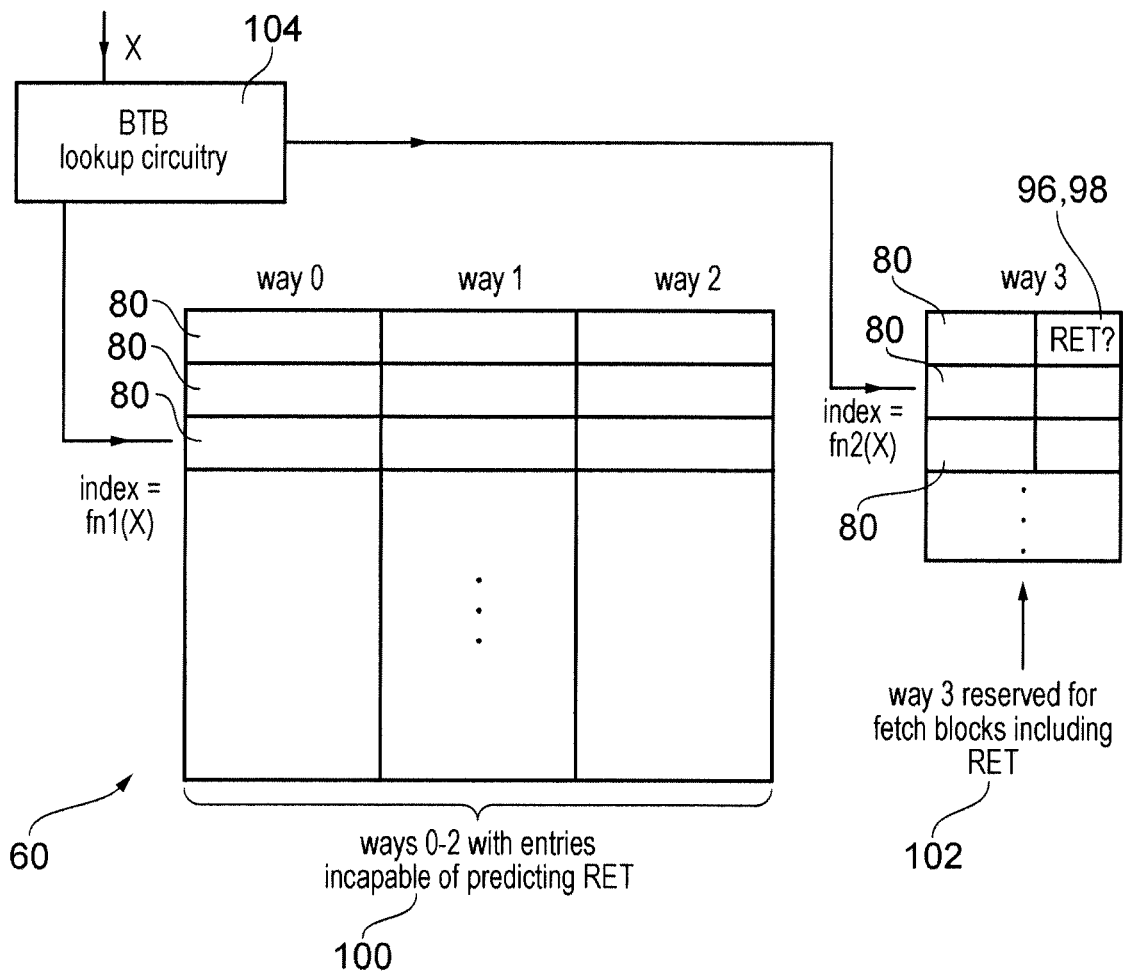
FIG. 9 shows a second embodiment in which a portion of the entries of the branch target buffer are reserved for return branches.

However, the inventors recognised that as shown in FIG. 4, in practice the call-return stack 64 is often provided for providing a prediction of the return address of a return branch instruction, and so in cases where the branch type 90 indicates a return branch instruction, the corresponding target address 94 is not used by the selector 66, and so recording this information in the BTB wastes storage capacity. FIGS. 8 and 9 show two examples of alternative BTB structures which provide entries with an encoding incapable of simultaneously encoding both that the block of instructions is predicted to include a return branch instruction and a prediction of the corresponding target address of the return branch instruction.

In the example of FIG. 8, a given BTB entry 80 of the BTB 60 may, in addition to the valid field 84, tag field 86 and N sets 88 of branch information for non-return branch instructions, include an additional return branch presence field 96 and return branch offset field 98. With this approach, the type field 90 indicated for each non-return branch 88 may encode only types of branches other than the return branch instruction. Hence, no encoding of the type field 90 is allocated to indicating return branches. The target address field 94 is omitted for the return branch indicated in fields 96, 98. This type of BTB entry therefore eliminates some of the bit cells needed for each entry because there is no need to provide a separate indication of the target address for the return branch. If the total number of non-return branches N is the same as in FIG. 7, the approach of FIG. 8 enables an increase in performance with relatively little additional area and power cost, because the number of bits needed to indicate the return branch presence 96 and return branch offset 98 is relatively small in comparison to indicating the target address 94. This enables a performance improvement because it means that the probability of correctly predicting the outcomes of branches in a given block of instructions is higher, as there is now more information available about a return branch in addition to N different other types of branches. As the branch prediction performance per entry is higher, this can allow the total number of entries to be reduced to save circuit area and power and improve lookup timing while maintaining a given level of performance. Alternatively, if N in the example of FIG. 8 is less than N in the example of FIG. 7 (e.g. one fewer branch field 88 is provided in comparison to FIG. 7) then this still enables fetch blocks 50 including a return branch to be predicted the same as in FIG. 7, but with a BTB entry 80 having fewer bits to save circuit area and power. The approach shown in FIG. 8 can be particularly useful because as shown in FIG. 3 it is relatively common for the return branch to appear in the same block of instructions as another conditional branch, in which case having an entry able to represent both the presence and offset of the return branch and the target address, type and offset for a non-return branch in the same block can be useful.

FIG. 9 shows another alternative way of representing the BTB entries. In this example, the BTB entries are divided into a first portion 100 which includes entries 80 which are incapable of predicting the presence of a return branch instruction within the corresponding fetch block of instructions. For example the entries 80 in the first portion 100 of the BTB may be similar to those shown in FIG. 7, except that the branch type 90 for each predicted branch 88 may not have any encoding allocated for indicating a return branch instruction.

On the other hand, in a second portion 102 of the BTB 60, each entry 80 may be reserved for fetch blocks which include a return branch instruction. For example, each entry 80 in the second portion 102 could simply comprise, in addition to valid and tag fields 84, 86 or any other information for locating whether the BTB includes an entry corresponding to the current fetch block X, an indication of return branch presence 96 and offset 98, without providing any predictions for any non-return branch instructions. That is the fields 88 shown in FIG. 8 could be omitted from each return branch predicting entry 80 within portion 102. For example portion 102 could be a dedicated way of a set-associative cache which is reserved for fetch blocks including the return branch. In some cases, the number of return branch supporting entries within portion 102 may be less than the total number of other entries within portion 100. BTB lookup circuitry 104 may be provided to lookup both portions 100, 102 of the BTB to determine whether, for a given fetch address X, there is a corresponding entry 80 which matches that block of instructions.

With this approach, some dedicated entries are reserved for return branches in the BTB. These entries may store the program counter address of the return branch, but not any target address of the return branch as this would be redundant in view of the CRS 64. As the return stack has space for a limited number of return addresses, the number of entries 80 in portion 102 can remain limited. This enables return branch presence predictions to be provided with much less bit storage in the BTB, so that performance can be increased without adding much extra hardware. Hence the performance boost per-bit of data storage can be increased.

Figure 10:
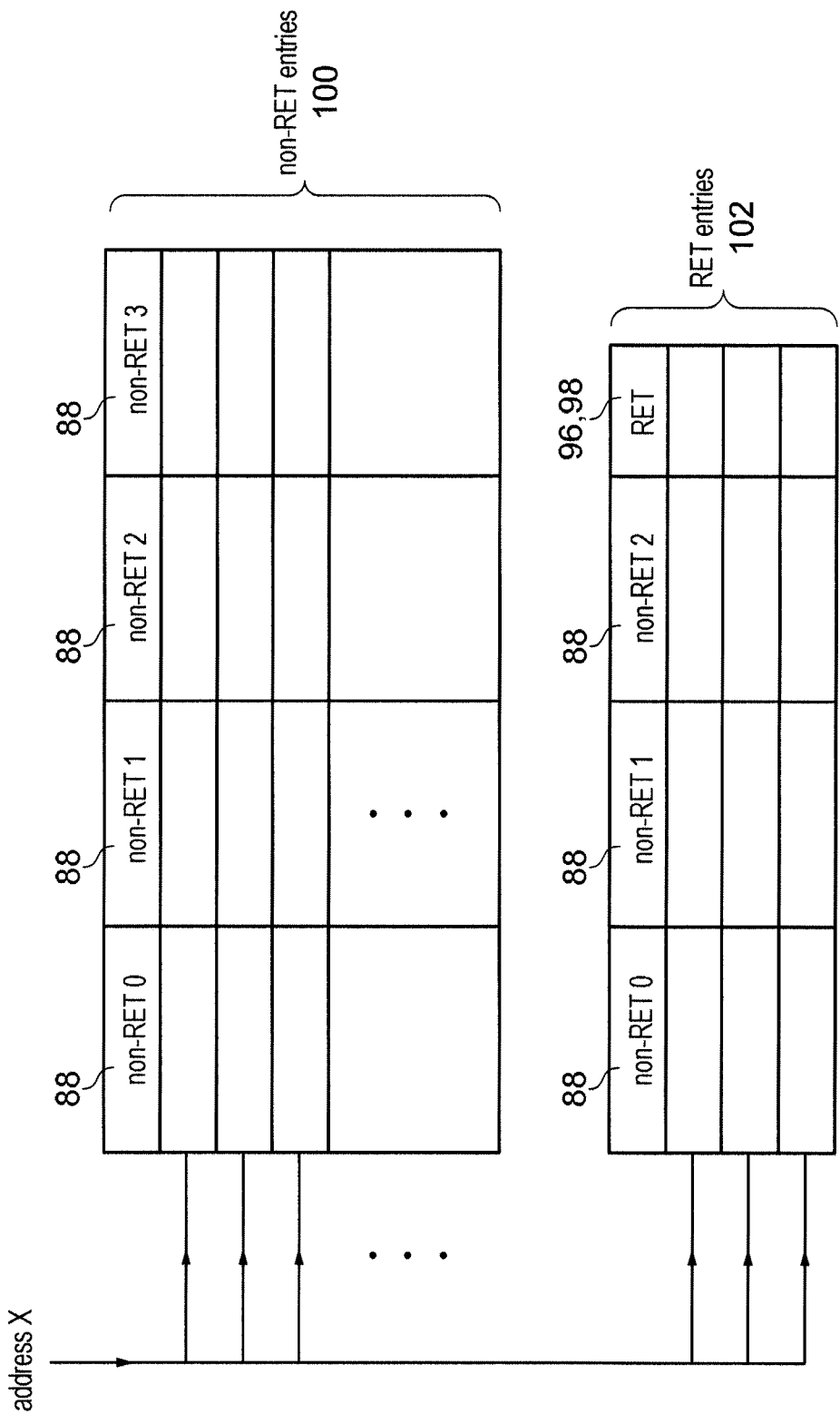
FIG. 10 shows a third embodiment in which a portion of the entries of the branch target buffer are reserved for return branches, and the entries in the reserved portion also support predictions for non-return branch instructions.

It will be appreciated that FIGS. 8 and 9 are just two approaches which could be used to provide BTB entries which prohibit any encoding of both the presence and target address for a return branch instruction. Another approach as shown in FIG. 10 could be to have a reserved portion 102 for return branches as shown in FIG. 9, but where each entry 80 in the reserved portion 102 can have a format similar to that of FIG. 8 where at least one set 88 of fields for a further branch of a type other than the return branch is also provided within the same entry as the return branch prediction itself. Note that the valid bit 84 and tag value 86 are not shown in FIG. 10 for conciseness, but would still be provided.

For example, the approach shown in FIG. 10 could be used in a system where the BTB is divided into a main BTB structure which stores a larger number of entries and a micro-BTB (u-BTB) structure which caches a smaller number of entries selected from the main BTB, with fetch block address lookups being performed first in the u-BTB, and a lookup to the main BTB being performed only if there is a miss in the u-BTB. With this approach, allocations are made in the u-BTB when there is a hit in the main BTB. No deallocations are made in the u-BTB. Instead, entries of the u-BTB are replaced with an allocation policy such as round-robin or a random scheme. The u-BTB may be fully associative, so all entries of the u-BTB may be looked up simultaneously.

Hence, the structure shown in FIG. 10 may be used for the u-BTB, to divide the u-BTB into non-return-branch-supporting (non-RET) entries 100 and return-branch-supporting (RET) entries 102. The main BTB structure may be implemented with entries similar to FIG. 8 for example. On a miss in the u-BTB and a hit in the main BTB, if the hit BTB entry predicts presence of the return branch, the hit entry may be allocated to one of the RET entries 102 of the u-BTB, while if the hit BTB entry predicts absence of any return branch, it may be allocated to one of the non-RET entries 100 of the u-BTB. On a lookup in the u-BTB for a particular fetch block address X, both the non-RET entries 100 and the RET entries 102 are looked up, with the tag values 86 in each non-RET entry 100 and each RET entry 102 being compared with the fetch address to determine whether there is a hit or miss. As in the previous examples, by eliminating the target address field for the return branch instruction from the BTB structure, this can improve area efficiency and timing.

Also, while the examples of FIGS. 8 to 10 show cases where the entire BTB structure is such that there are no entries capable of indicating both a prediction of the presence of a return branch in the looked up block of instructions and a prediction of the return branch's target address, this is not essential. In some cases, only a portion of entries 80 of the BTB may have an encoding which is incapable of simultaneously encoding both return branch presence and the corresponding target address. In this case there may still also be some entries 80 of the type shown in FIG. 7 which provide a full prediction of branch type and branch targets 90, 94 which permit the target to be indicated by the target field 94 even for return branches. However, the provision of such entries may provide redundant information in view of the CRS 64, and so it may be more efficient if the entire BTB structure 60 includes entries for which every entry is incapable of specifying both return branch presence and return branch target address (i.e. it is only possible for return branch presence to be indicated in an entry where there is not a corresponding indication of the target address for the return branch, while those entries which do permit the indication of a target address only provide that target address prediction for non-return branches).

Figure 11:
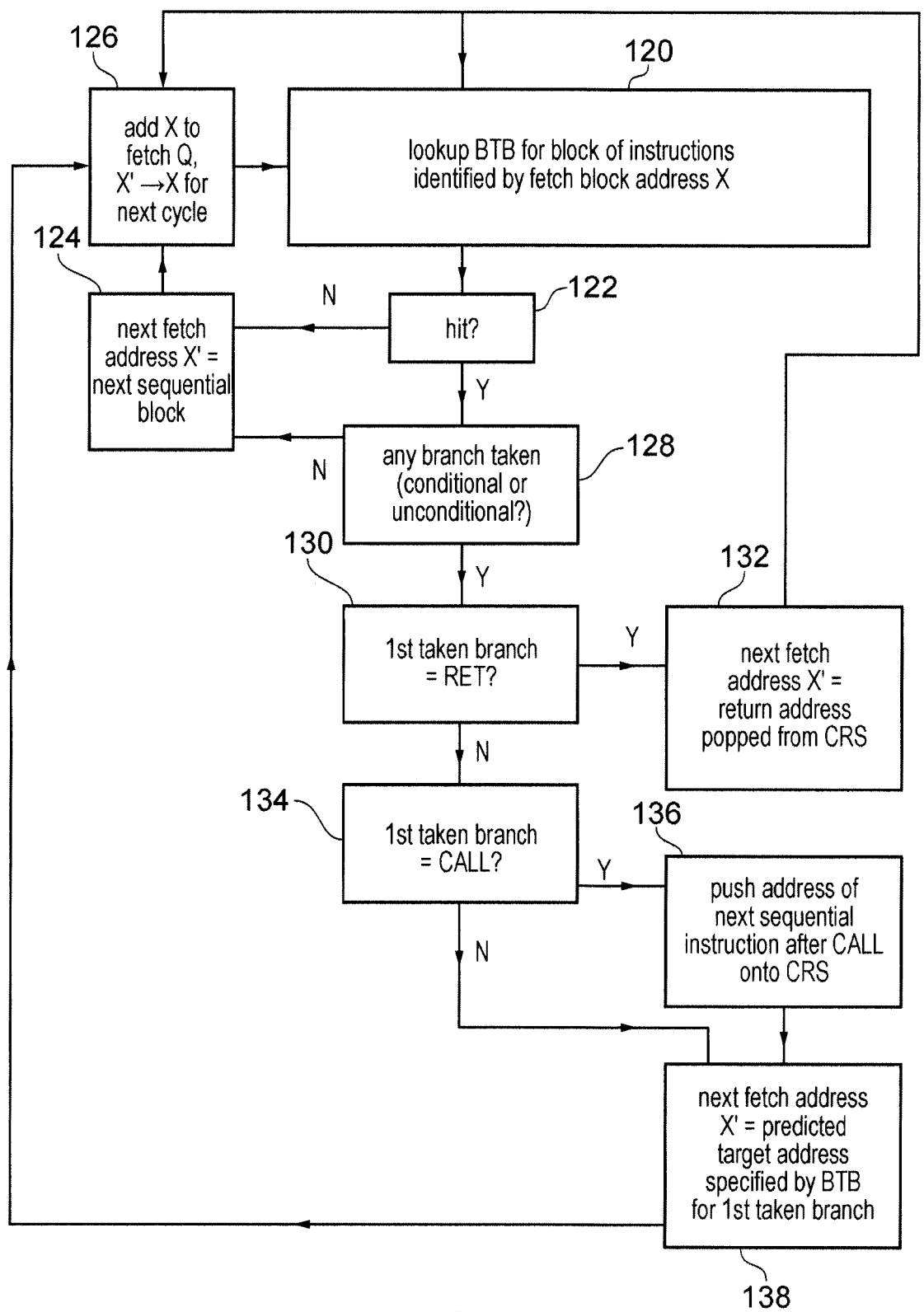
FIG. 11 is a flow diagram illustrating a method of looking up the BTB.

FIG. 11 is a flow diagram showing a method of looking up a BTB, for example using the BTB lookup circuitry 104. At step 120 the BTB 60 is looked up for a block of instructions identified by the fetch block address X. The index value for looking up the BTB is computed based on the fetch block address and this indexes into a certain set of entries 80 of the BTB, and then any tags 86 of the indexed set of entries are compared with corresponding portions of the fetch block address X to determine whether any of the indexed entries match the fetch block address. At step 122 the BTB lookup circuitry 104 determines whether there was a hit in the BTB (i.e. whether there was an indexed entry for which the tag matched). If not, then no branches are predicted to be present within the current fetch block and so at step 124 the next fetch address X' is set to the address of the next block of instructions which follows sequentially from the current block. At step 126 the current fetch address X and addresses of any subsequent instructions in the same fetch block are added to the fetch queue 68 and then the next fetch address X' becomes the fetch block address X for the next cycle of branch prediction, and then the method proceeds back to step 120.

If there was a hit in the BTB at step 122, then at step 128 the selector 66 determines, based on the outputs of the BTB 60 and the BDP 62, whether the current fetch block of instructions is predicted to include any taken branch instruction (either conditional or unconditional, including return or procedure calling branches). If there is no branch predicted to be taken then again the method proceeds to step 124 where the next fetch address is the address of the next block of instructions following on sequentially in the program flow.

If at step 128 the selector 66 determines that there is at least one taken branch predicted, then at step 130, the selector 66 determines whether the first taken branch in the block is predicted to be a return branch instruction. If so, then at step 132 the next fetch address X' is predicted to be the return address which is popped from the top of the call-return stack 64. Hence the pointer which points to the top of the stack is updated so that the next most recently pushed address onto the CRS becomes the top of the stack. Hence, the prediction made by the CRS 64 is used in preference to any indication of the target address provided by the BTB 60 (although with the encoding shown in FIGS. 8 and 9, the BTB will not provide any target address prediction when the branch is predicted to be a return branch). After step 132 the method returns to step 126 again to update the fetch queue with address X and the addresses of subsequent instructions up to the taken branch, and then the next fetch address becomes the current fetch address for the next branch prediction cycle.

If at step 130, the first taken branch is not predicted to be a return branch then at step 134 the selector 66 determines whether the first taken branch is predicted to be a procedure calling branch. If so then at step 136 the address of the next sequential instruction after the calling instruction is pushed onto the call return stack 64, and at step 138 the next fetch address X' is the predicted target address specified by the BTB for the first taken branch. The method then proceeds to back to step 126 where the current fetch address X and any addresses of instructions up to the first taken branch are added to the fetch queue, and the method continues to step 120 for the next branch prediction cycle with the next fetch address X' from the previous cycle becoming the fetch block address X for the current cycle. If at step 134 the first taken branch was not predicted to be a procedure calling branch then step 136 is omitted, and the next fetch address X' is predicted based on the output of the BTB at step 138 as described above.

While FIG. 11 shows the target address predictions being made based on the BTB and CRS, some examples of branch predictors could also have additional prediction structures for predicting branch target addresses for specific types of branches, such as polymorphic branches. Hence, if another branch prediction structure predicts a target address with a certain level of confidence, or if the branch type predicted by the BTB for the first taken branch indicates that the branch type is better predicted using another branch prediction structure, then the target address predicted by this other branch prediction structure could be used instead of the target address provided by the BTB at step 138.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Branch prediction circuitry comprising:
a return address prediction structure to store at least one predicted return address;
a branch target buffer (BTB) structure comprising a plurality of entries for specifying predicted branch information for a corresponding block of instructions; and
BTB lookup circuitry to look up whether the BTB structure comprises a corresponding entry for a given block of instructions, and when the BTB structure comprises the corresponding entry, to determine, based on the predicted branch information specified in the corresponding entry:
a prediction of whether the given block of instructions includes a return branch instruction for which a predicted target address is to be predicted based on a predicted return address obtained from the return address prediction structure;
a prediction of whether the given block of instructions includes at least one other type of branch instruction other than the return branch instruction; and
when the given block of instructions is predicted to include the at least one other type of branch instruction, a predicted target address of the at least one other type of branch instruction; in which:
within at least a subset of entries of the BTB structure, each entry specifies the predicted branch information with an encoding incapable of simultaneously indicating both:
that the corresponding block of instructions is predicted to include the return branch instruction; and
the predicted target address for the return branch instruction;
wherein the BTB structure comprises at least one return-branch-supporting entry to specify predicted branch information with an encoding capable of indicating that the corresponding block of instructions is predicted to include the return branch instruction, and
each return-branch-supporting entry is capable of specifying predicted branch information for a maximum of M branch instructions within the given block of instructions, and the total number of bits used to encode the return-branch-supporting entry is insufficient to encode M separate predicted target addresses.

2. The branch prediction circuitry according to claim 1, in which, for each return-branch-supporting entry, the predicted branch information specifies an offset value identifying an offset of an address of an instruction predicted to be the return branch instruction relative to an address identifying the corresponding block of instructions.

3. The branch prediction circuitry according to claim 1, in which, for each return-branch supporting entry, the predicted branch information also specifies information relating to at least one further branch instruction of the at least one other type that is within the same block of instructions as the return branch instruction.

4. The branch prediction circuitry according to claim 3, in which, for each further branch instruction of the other type, the predicted branch information comprises a predicted target address for that further branch instruction.

5. The branch prediction circuitry according to claim 3, in which, for each further branch instruction of the other type, the predicted branch information comprises a predicted branch type represented by an encoding incapable of identifying that the predicted branch type is the return branch instruction.

6. The branch prediction circuitry according to claim 1, in which the BTB lookup circuitry is configured to exclusively reserve the at least one return-branch-supporting entry for storing predicted branch information for blocks of instructions that include a branch instruction predicted to be a return branch instruction.

7. The branch prediction circuitry according to claim 1, in which the BTB structure also comprises at least one non-return-branch-supporting entry to specify predicted branch information with an encoding incapable of indicating that the corresponding block of instructions is predicted to include the return branch instruction.

8. The branch prediction circuitry according to claim 7, in which when the corresponding entry is one of the at least one non-return-branch-supporting entry, the BTB lookup circuitry is configured to determine that the given block of instructions is not predicted to include the return branch instruction.

9. The branch prediction circuitry according to claim 7, in which, for each branch instruction identified by a non-return-branch-supporting entry, the predicted branch information comprises a predicted branch type represented by an encoding incapable of identifying that the predicted branch type is the return branch instruction.

10. The branch prediction circuitry according to claim 7, in which the number of return-branch-supporting entries is less than the number of non-return-branch-supporting entries.

11. The branch prediction circuitry according to claim 1, in which the return address prediction structure comprises a last-in-first-out data structure.

12. The branch prediction circuitry according to claim 11, in which the BTB lookup circuitry is configured to push a return address onto the last-in-first-out data structure in response to a determination that the corresponding entry of the BTB structure provides a prediction that the given block of instructions comprises a procedure call instruction with no earlier branch instruction of the given block of instructions being predicted taken.

13. The branch prediction circuitry according to claim 1, comprising a selector configured to select, based on a plurality of branch prediction structures including the return branch prediction structure and the BTB structure, a next instruction fetch block address identifying a next block of instructions to be fetched; in which:
when the BTB structure provides a prediction that the given block of instructions includes the return branch instruction and no earlier branch instruction of the given block of instructions is predicted taken, the selector is configured to select the return branch address provided by the return branch prediction structure as a predicted target address for the return branch instruction.

14. The branch prediction circuitry according to claim 1, in which the subset of entries comprises all entries of the BTB structure.

15. A data processing apparatus comprising the branch prediction circuitry of claim 1.

16. A branch prediction method comprising:
looking up whether a branch target buffer (BTB) structure, which comprises a plurality of entries each for specifying predicted branch information for a corresponding block of instructions, comprises a corresponding entry for a given block of instructions; and
when the BTB structure comprises the corresponding entry, determining based on the predicted branch information specified in the corresponding entry:
a prediction of whether the given block of instructions includes a return branch instruction for which a predicted target address is to be predicted based on a predicted return address obtained from a return address prediction structure;
a prediction of whether the given block of instructions includes at least one other type of branch instruction other than the return branch instruction; and
when the given block of instructions is predicted to include the at least one other type of branch instruction, a predicted target address of the at least one other type of branch instruction; in which:
within at least a subset of entries of the BTB structure, each entry specifies the predicted branch information with an encoding incapable of simultaneously indicating both:
that the corresponding block of instructions includes the return branch instruction; and
the predicted target address for the return branch instruction;
wherein the BTB structure comprises at least one return-branch-supporting entry to specify predicted branch information with an encoding capable of indicating that the corresponding block of instructions is predicted to include the return branch instruction, and
each return-branch-supporting entry is capable of specifying predicted branch information for a maximum of M branch instructions within the given block of instructions, and the total number of bits used to encode the return-branch-supporting entry is insufficient to encode M separate predicted target addresses.

17. Branch prediction circuitry comprising:
a return address prediction structure to store at least one predicted return address;
a branch target buffer (BTB) structure comprising a plurality of entries for specifying predicted branch information for a corresponding block of instructions; and
BTB lookup circuitry to look up whether the BTB structure comprises a corresponding entry for a given block of instructions, and when the BTB structure comprises the corresponding entry, to determine, based on the predicted branch information specified in the corresponding entry:
a prediction of whether the given block of instructions includes a return branch instruction for which a predicted target address is to be predicted based on a predicted return address obtained from the return address prediction structure;
a prediction of whether the given block of instructions includes at least one other type of branch instruction other than the return branch instruction; and
when the given block of instructions is predicted to include the at least one other type of branch instruction, a predicted target address of the at least one other type of branch instruction; in which:
within at least a subset of entries of the BTB structure, each entry specifies the predicted branch information with an encoding incapable of simultaneously indicating both:
that the corresponding block of instructions is predicted to include the return branch instruction; and
the predicted target address for the return branch instruction;
wherein the BTB structure comprises at least one return-branch-supporting entry to specify predicted branch information with an encoding capable of indicating that the corresponding block of instructions is predicted to include the return branch instruction,
for each return-branch-supporting entry, a field for specifying the predicted target address for the return branch instruction is omitted from the predicted branch information specified in the return-branch-supporting entry, and
wherein the field for specifying the predicted target address for the return branch instruction is omitted because storage circuitry for storing the return-branch-supporting entry does not have bitcells to store the field for specifying the predicted target address for the return branch instruction.

* * * * *